US009310652B2

(12) United States Patent
Yonekura et al.

(10) Patent No.: US 9,310,652 B2
(45) Date of Patent: Apr. 12, 2016

(54) LIQUID CRYSTAL DISPLAY DEVICE

(71) Applicant: Japan Display Inc., Minato-ku (JP)

(72) Inventors: Toshimasa Yonekura, Ishikawa-ken (JP); Masato Kesho, Ishikawa-ken (JP)

(73) Assignee: Japan Display Inc., Minato-ku (JP)

( * ) Notice: Subject to any disclaimer, the term of this patent is extended or adjusted under 35 U.S.C. 154(b) by 208 days.

(21) Appl. No.: 13/940,596

(22) Filed: Jul. 12, 2013

(65) Prior Publication Data

US 2014/0016074 A1 Jan. 16, 2014

(30) Foreign Application Priority Data

Jul. 13, 2012 (JP) ................................ 2012-157714

(51) Int. Cl.

*G02F 1/1343* (2006.01)
*G02F 1/1362* (2006.01)
*G02F 1/1337* (2006.01)

(52) U.S. Cl.

CPC ........ *G02F 1/134336* (2013.01); *G02F 1/1362* (2013.01); *G02F 2001/133776* (2013.01)

(58) Field of Classification Search

CPC ............. G09G 3/3648; G09G 2300/08; G02F 2201/123
USPC .......................................................... 349/141
See application file for complete search history.

(56) References Cited

U.S. PATENT DOCUMENTS

| | | | | |
|---|---|---|---|---|
| 6,266,116 | B1 | 7/2001 | Ohta et al. | |
| 6,657,693 | B1 | 12/2003 | Jeong et al. | |
| 2001/0010575 | A1 | 8/2001 | Yoshida et al. | |
| 2004/0165136 | A1 | 8/2004 | Sugiyama et al. | |
| 2004/0218130 | A1 | 11/2004 | Hsieh et al. | |
| 2005/0206824 | A1 | 9/2005 | Son et al. | |
| 2005/0219453 | A1 | 10/2005 | Kubo et al. | |
| 2006/0250560 | A1* | 11/2006 | Lee et al. | 349/141 |
| 2007/0115234 | A1 | 5/2007 | Kim et al. | |
| 2007/0182904 | A1* | 8/2007 | Kim et al. | 349/129 |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

Office Action issued Jan. 26, 2016 in Japanese Patent Application No. 2012-157714 (with English Translation).

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

An array substrate includes a pixel electrode having a contact portion, a pair of main pixel electrodes extending in a first direction from the contact portion, and a sub-pixel electrode arranged between the contact portion and an end of the main pixel electrode so as to connect the main pixel electrodes. A counter substrate includes a common electrode having first, second and third main common electrodes. The third main common electrode is arranged substantially in the center between the pair of main pixel electrodes. A sub-common electrode is arranged between the contact portion and the sub-pixel electrode in the first direction. The third main common electrode includes a cutout portion, and the sub-pixel electrode crosses the third main common electrode at the cutout portion. The first sub-common electrode includes cutout portions, and the pair of main pixel electrodes cross the first sub-common electrode at the cutout portions, respectively.

20 Claims, 5 Drawing Sheets

(56) References Cited

U.S. PATENT DOCUMENTS

| | | | |
|---|---|---|---|
| 2008/0062358 | A1 | 3/2008 | Lee et al. |
| 2008/0180590 | A1 | 7/2008 | Lee et al. |
| 2008/0180623 | A1 | 7/2008 | Lee et al. |
| 2008/0186439 | A1 | 8/2008 | Kwon et al. |

FOREIGN PATENT DOCUMENTS

| | | | |
|---|---|---|---|
| JP | 9-160041 | | 6/1997 |
| JP | 9-160042 | | 6/1997 |
| JP | 9-160061 | | 6/1997 |
| JP | 10-26765 | | 1/1998 |
| JP | 10-90708 | | 4/1998 |
| JP | 2002-072250 | A | 3/2002 |
| JP | 2005-3802 | | 1/2005 |
| JP | 3644653 | | 2/2005 |
| JP | 2005-173617 | A | 6/2005 |
| JP | 2005-242307 | | 9/2005 |

* cited by examiner

LIQUID CRYSTAL DISPLAY DEVICE

CROSS-REFERENCE TO RELATED APPLICATION

This application is based upon and claims the benefit of priority from prior Japanese Patent Applications No. 2012-157714 filed Jul. 13, 2012, the entire contents of which are incorporated herein by reference.

FIELD

Embodiments described herein relate generally to a liquid crystal display device.

BACKGROUND

In recent years, a flat panel display device is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electrical field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
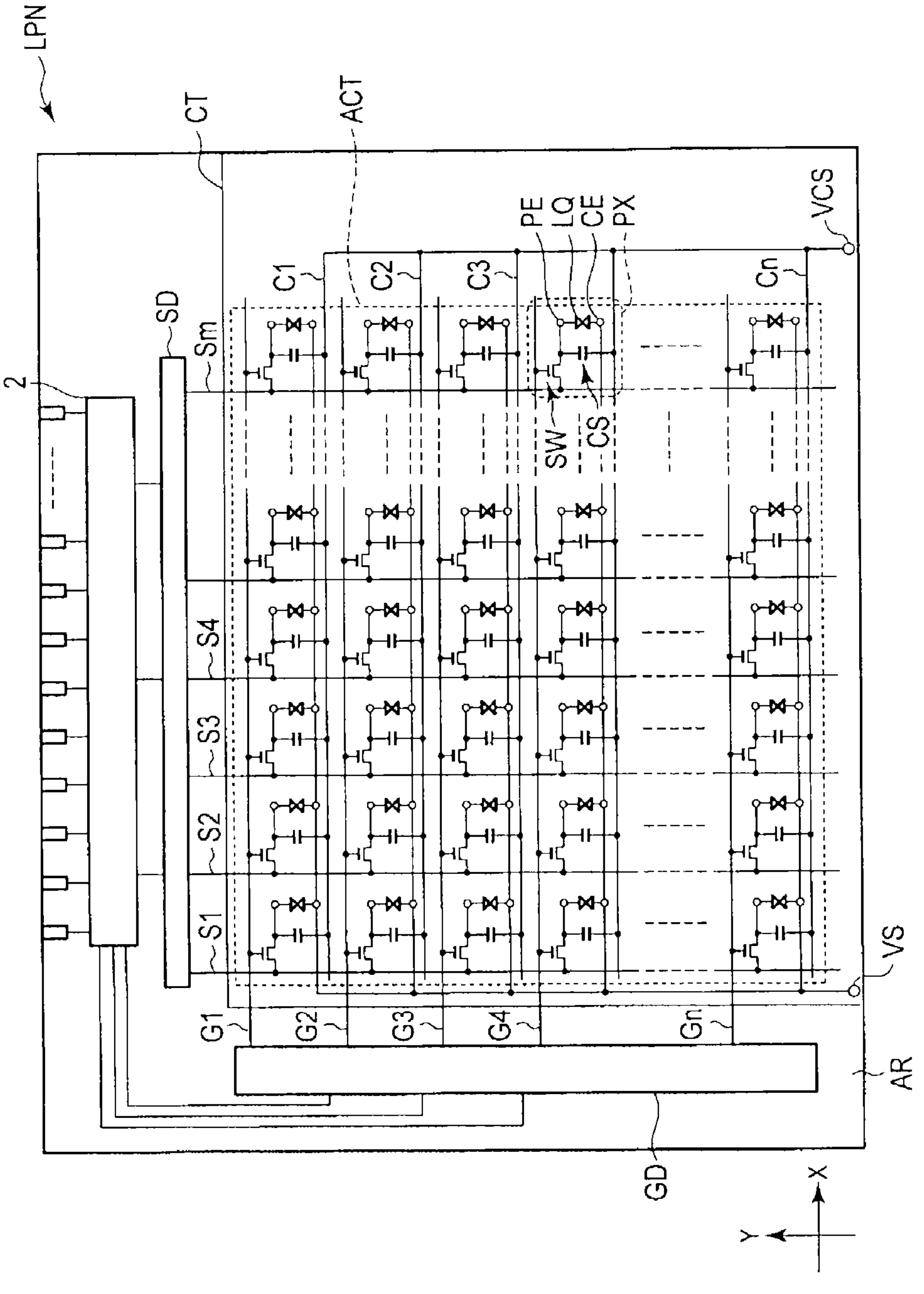
FIG. 1 is a view schematically showing a structure and an equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate provided with a pixel electrode including a contact portion, a pair of main pixel electrodes extending in a first direction from the contact portion, and a sub-pixel electrode arranged between the contact portion and an end of the extending main pixel electrode in the first direction, the sub-pixel electrode extending in a second direction orthogonally crossing the first direction so as to connect the pair of main pixel electrodes; a second substrate provided with a common electrode including first and second main common electrodes sandwiching the pair of main pixel electrodes, a third main common electrode arranged substantially in the center between the pair of main pixel electrodes and extending in parallel with the first and second main common electrodes, and a first sub-common electrode arranged between the contact portion and the sub-pixel electrode in the first direction, the first sub-common electrode connected with the first, second and third main common electrodes and extending in the second direction; and a liquid crystal layer held between the first substrate and the second substrate and having liquid crystal molecules; wherein the third main common electrode includes a cutout portion, and the sub-pixel electrode crosses the third main common electrode at the cutout portion, and the first sub-common electrode includes cutout portions, and the pair of main pixel electrodes cross the first sub-common electrode at the cutout portions, respectively.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C extend in a first direction X, respectively. The gate lines G and the auxiliary capacitance lines C are arranged in turns along a second direction Y that orthogonally intersects the first direction X. The source lines S cross the gate lines G and the capacitance lines C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT and connected to a gate driver GD. Each source line S is pulled out to the outside of the active area ACT and connected to a source driver SD. At least a portion of the gate driver GD and the source driver SD is formed in the array substrate AR, for example, and the gate driver GD and the source driver SD are connected with a driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrates.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electric conductive component which is not illustrated.

Figure 2A:
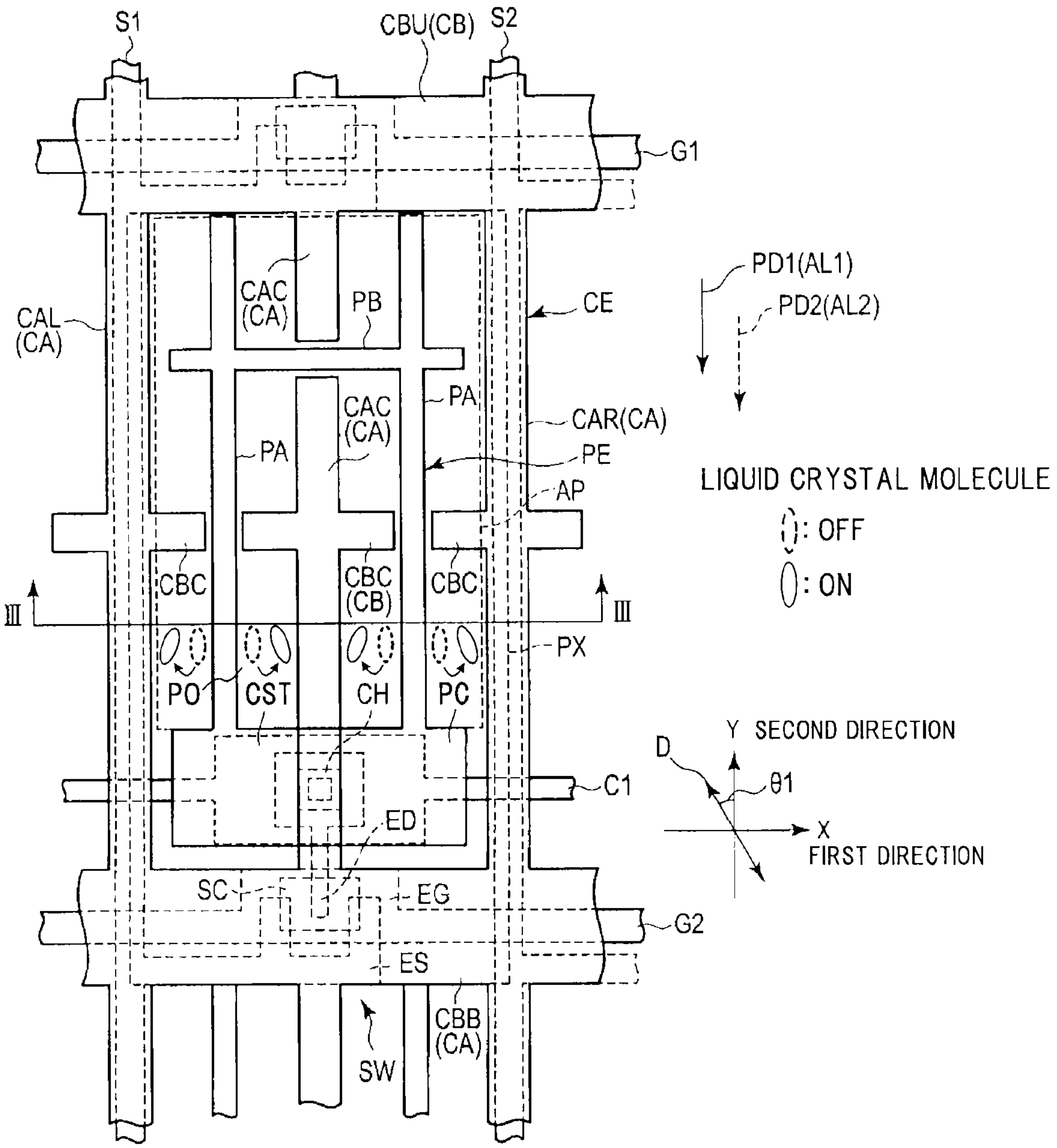
FIG. 2A is a plan view schematically showing a structure of a pixel when a display panel shown in FIG. 1 is seen from a counter substrate side according to a first embodiment.

FIG. 2A is a plan view schematically showing the structure of one pixel when the liquid crystal display panel LPN according to a first embodiment is seen from the counter substrate side. Herein, a plan view in a X-Y plane specified in the first direction X and the second direction Y is shown.

The pixel PX has the shape of a rectangle whose length in the first direction X is shorter than the length in the second direction Y. In addition, according to this embodiment, the width of the pixel PX in the first direction X is approximately 50 μm, and the width of the pixel PX in the second direction Y is approximately 150 μm.

The gate line G1 and the gate line G2 extend along the first direction X. The auxiliary capacitance line C1 is arranged between the adjoining gate line G1 and gate line G2, and extends along the first direction X. The source line S1 and the source line S2 extend along the second direction Y. The pixel electrode PE is arranged between the adjoining source line S1 and source line S2. Moreover, the pixel electrode PE is located between the gate line G1 and the gate line G2.

In the illustrated example, the source line S1 is arranged at the left-hand side end in the pixel PX. Precisely, the source line S1 is arranged striding over a boundary between the illustrated pixel PX and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side.

Moreover, in the pixel PX, the gate line G1 is arranged at an upper end portion. Precisely, the gate line G1 is arranged striding over a boundary between the illustrated pixel PX and a pixel PX which adjoins the illustrated pixel PX on its upper end side. The gate line G2 is arranged at a lower end portion. Precisely, the gate line G2 is arranged striding over a boundary between the illustrated pixel PX and a pixel PX which adjoins the illustrated pixel PX on its lower end side.

The auxiliary capacitance line C1 is arranged near a lower end portion (near the switching element SW connected with the pixel electrode PE) of the pixel PX). In a substantially central portion in the first direction X of the pixel PX, the auxiliary capacitance line C1 is equipped with a capacitance portion CsT in which the width in the second direction Y is broadened.

The switching element SW is electrically connected with the gate line G2 and the source line S1 in the illustrated example. Namely, the switching element SW is formed near an intersection of the gate line G2 with the source line S1.

A gate electrode EG of the switching element SW is electrically connected with the gate line G2 or integrally formed, a source electrode ES is electrically connected with the source line S1 or integrally formed, and a drain electrode ED is electrically connected with the pixel electrode PE through a contact hole CH formed in a region which overlaps with the auxiliary capacitance line C1. The drain electrode ED of the switching element SW extends from the lower end of the pixel PX to under the pixel electrode PE along the second direction Y.

The pixel electrode PE is equipped with a pair of main pixel electrodes PA, a sub-pixel electrode PB, and a contact portion PC which are electrically connected mutually. The contact portion PC is arranged near the bottom end (near the switching element SW connected with the pixel electrode PE) of the pixel PX. Two main pixel electrodes PA linearly extend along the second direction Y, respectively, from two positions inside of both ends facing the source lines S of the contact portion PC to near the upper end portion of the pixel PX. That is, the ends of the contact portion PC extend to the source line S1 and S2 sides and protrude from the ends of the main pixel electrode PA in the first direction X. In addition, the ends of the contact portion PC may extend to the source line S1 and S2 sides not so as to be electrically connected with adjoining pixel electrodes and may extend to on the source lines S1 and S2.

The main pixel electrode PA is formed in the shape of a belt having substantially the same width along the first direction X. The contact portion PC is electrically connected with the drain electrode DE of the switching element SW through the contact hole CH. The contact portion PC is formed more broadly than the main pixel electrode PA in the first direction X, and arranged facing the capacitance portion CsT.

The sub-pixel electrode PB is arranged extending in the first direction X between the contact portion PC and an end of the main pixel electrode PA near a gate line G1. The sub-pixel electrode PB extends in the first direction X, and connects between the main pixel electrodes PA. That is, the pixel electrode PE includes an aperture substantially in the shape of a rectangle surrounded with the main pixel electrode PA, sub-pixel electrode PB and the contact portion PC. The ends of the sub-pixel electrodes PB extend to the source line S1 and S2 sides and protrude beyond the ends of the main pixel electrodes PA.

In addition, the sub-pixel electrode PB may extend to the source line S1 and S2 sides not so as to be electrically connected with pixel electrodes of adjoining pixels and may extend on the source lines S1 and S2. In case a main common electrode is arranged on the array substrate AR facing the source line S, the contact portion PC of the pixel electrode PE and the sub-pixel electrode PB may extend to the source line S1 and S2 sides beyond the main pixel electrode PA in the first direction X not so as to be electrically connected with the main common electrode.

The common electrode CE is equipped with three main common electrodes CA and a sub-common electrode CB on the counter substrate CT. The main common electrodes CA extend linearly along the second direction Y in parallel with the main pixel electrodes PA on the both sides sandwiching the main pixel electrode PA in the X-Y plane. That is, while the main common electrodes CA counter with the source lines S and the counter portion PC, the main common electrodes CA extend substantially in parallel with the main pixel electrodes PA. The main common electrodes CA are formed in the shape of a belt having the same width along the first direction X.

In the illustrated example, the main common electrodes CA are arranged in three lines in parallel along the first direction X. The main common electrodes CA are arranged in the both sides and the center of the pixel PX, respectively. Hereinafter, in order to distinguish the three lines, the main common electrode CA on the left-hand side in the figure is called CAL, the main common electrode on the right-hand side is called CAR, and the main common electrode in the center is called CAC. The main common electrode CAL counters with the source line S1, the main common electrode CAR counters with the source line S2, and the main common electrode CAC counters with the contact portion PC between the main pixel electrodes PA of the pixel electrode PE. In the active area ACT or outside of the active area, the main common electrode CAL, the main common electrode CAR and the main common electrode CAC are electrically connected each other.

In the pixel PX, the main common electrode CAL is arranged at the left-hand side end. Precisely, the main common electrode CAL is arranged striding over a boundary between the illustrated pixel PX and a pixel PX which adjoins the illustrated pixel PX on the left-hand side. The main common electrode CAR is arranged at the right-hand side end. Precisely, the main common electrode CAR is arranged striding over a boundary between the illustrated pixel and a pixel which adjoins the illustrated pixel PX on the right-hand side. The main common electrode CAC is arranged substantially in the center of the pixel PX in the first direction X.

In this embodiment, the main common electrode CAC includes a cutout portion, and the sub-pixel electrode PB crosses the main common electrode CAC at the cutout portion when seeing from the counter substrate side. That is, the main common electrode CAC is arranged between the adjoining sub-pixel electrodes PB in the second direction Y. Ends of the cutout portion of the main common electrode CAC extending in the second direction Y are arranged apart from the sub-pixel electrode PB with a predetermined distance therebetween when seeing from the counter substrate side.

In the illustrated example, the sub-common electrodes CB are arranged in the upper and lower end portions of the pixel PX, respectively, facing the gate lines G1 and G2, and in the center of the pixel PX extending in the first direction X. Hereinafter, in order to distinguish the three sub-common electrodes CB, the sub-common electrode CB in the upper end portion in the figure is called CBU, the sub-common electrode CB in the bottom end portion is called CBB, and the sub-common electrode CB in the center is called CBC.

The sub-common electrode CBU faces the gate line G1 and the sub-common electrode CBB faces the gate line G2. The sub-common electrode CBC extends in the X direction between the adjoining main pixel electrodes PA when seeing from the counter substrate side. The ends of the sub-common electrode CBC are arranged with a predetermined distance between the ends of the sub-common electrode CBC and the main pixel electrodes PA, respectively. The sub-common electrode CBC includes cutout portions, and the first and second main pixel electrodes PA cross the first sub-common electrode at the cutout portions, respectively. The sub-common electrode CBC including three portions is electrically connected with the main common electrodes CAL, CAR and CAC in a cross shape.

The sub-common electrode CBU, the sub-common electrode CBB, and the sub-common electrode CBC are electrically connected in the active aria or outside of the active area each other. That is, the common electrode CE is formed in the shape of an approximately lattice in the active area.

In the pixel PX, the sub-common electrode CBU is arranged at the upper end portion, and the sub-common electrode CBB is arranged at the bottom end portion. Precisely, the sub-common electrode CBU is arranged striding over a boundary between the illustrated pixel PX and an adjoining pixel PX in the upper end portion, and the sub-common electrode CBB is arranged striding over a boundary between the illustrated pixel and an adjoining pixel PX in the lower end portion. The sub-common electrode CBC is arranged between the sub-common electrode CBU and the sub-common electrode CBB in the second direction Y.

If its attention is paid to the positional relationship between the pixel electrode PE and the main common electrode CA, the main pixel electrode PA and the main common electrode CA are arranged by turns along the first direction X. The main pixel electrodes PA and the main common electrodes CA are arranged substantially in parallel each other. At this time, the main common electrode CAL, the main common electrode CAR, and the main common electrode CAC do not overlap with the main pixel electrodes PA in the X-Y plane. The main common electrode CAC is arranged in a position facing the aperture PO of the pixel electrode PE.

That is, one main pixel electrode PA is arranged between the adjoining main common electrode CAL and main common electrode CAC, and between the main common electrode CAR and the main common electrode CAC. That is, the main common electrode CAL, the main common electrode CAR, and the main common electrode CAC are arranged on the both sides which sandwich the main pixel electrode PA, respectively. For this reason, the main common electrode CAL, the main pixel electrode PA, the main common electrode CAC, the main pixel electrode PA, and the main common electrode CAR are arranged along the first direction X in this order.

The distance between the pixel electrode PE and the common electrode CE is substantially the same in the first direction X. Namely, the distances between the main common electrode CAL and the main pixel electrode PA, between the main common electrode CAC and the main pixel electrode PA, and between the main common electrode CAR and the main pixel electrode PA are substantially the same in the first direction X.

In FIG. 2A, the sub-common electrode CBU, the sub-pixel electrode PB, the sub-common electrode CBC, the contact portion PC, and the sub-common electrode CBB are arranged from the upper end portion in this order along the second direction Y. The distances between the contact portion PC and the sub-common electrode CBC, between the sub-common electrode CBC and the sub-pixel electrode PB, and between the sub-pixel electrode PB and the sub-common electrode CBU are substantially the same, respectively.

Figure 3:
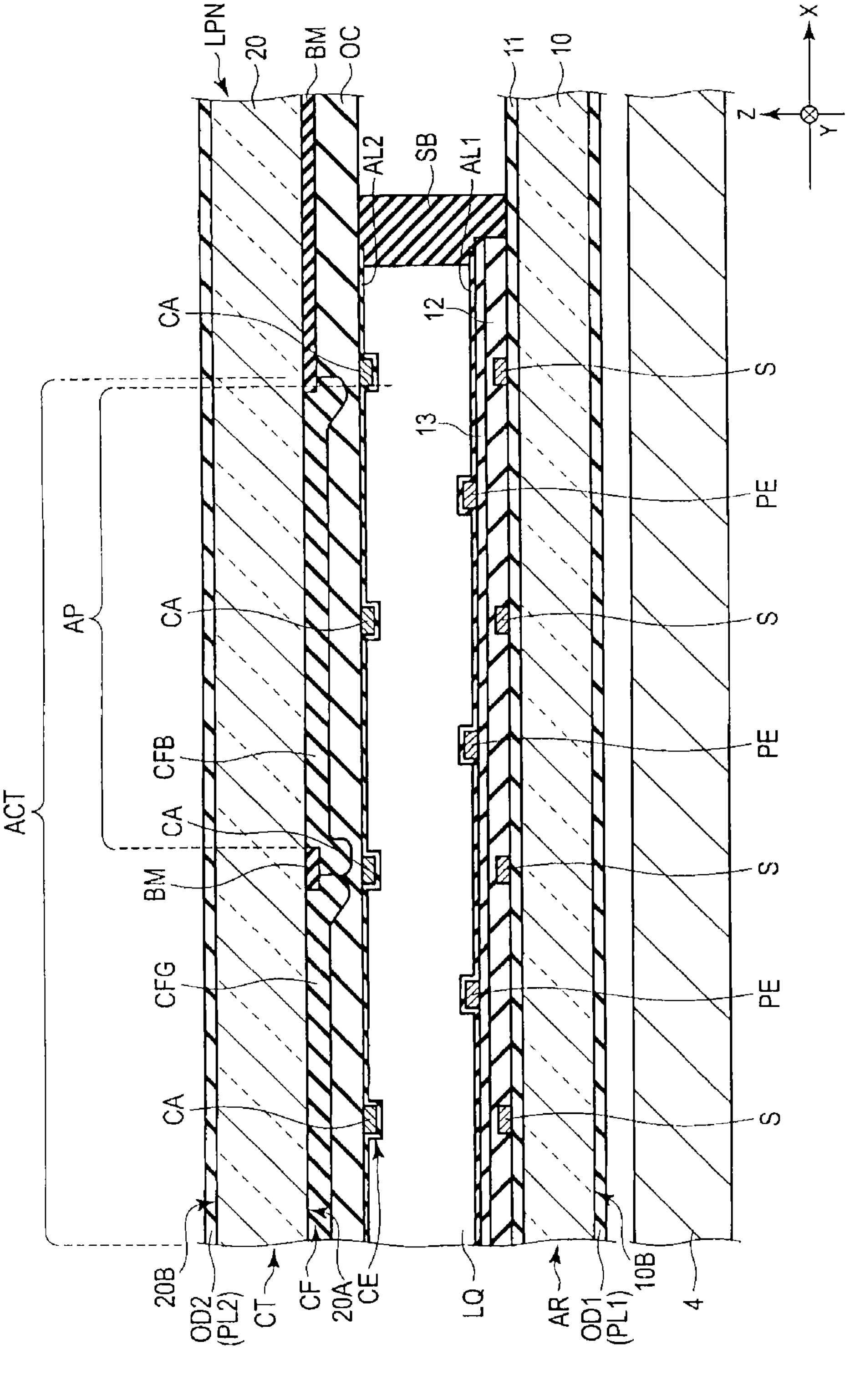
FIG. 3 is a cross-sectional view schematically showing the structure of the liquid crystal display panel taken along line III-III shown in FIG. 2A.

FIG. 3 is a cross-sectional view schematically showing a cross-sectional structure taken along line III-III in the liquid crystal display panel LPN shown in FIG. 2A. In addition, only a portion required for explanation is illustrated here.

A backlight 4 is arranged on the back side of the array substrate AR in the illustrated example. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a transmissive characteristics. The source line S is formed on a first interlayer insulating film 11 and covered with a second interlayer insulating film 12. In addition, the gate line and the auxiliary capacitance line which are not illustrated are arranged between the first insulating substrate 10 and the first interlayer insulating film 11, for example. An overcoat layer 13 is formed on the second interlayer insulating film 12. The pixel electrode PE is formed on the overcoat layer 13. The pixel electrode PE is located inside of the pixel rather than the position on the respective adjoining source lines S.

A first alignment film AL1 is arranged on the array substrate AR facing the counter substrate CT, and extends to whole active area ACT. The first alignment film AL1 covers the pixel electrode PE, etc., and is also arranged on the overcoat layer 13. The first alignment film AL1 is formed of the material which shows a horizontal alignment characteristics. In addition, the array substrate AR may be further equipped with a portion of the common electrodes CE.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM is formed on the second insulating substrate 20 defining each pixel PX, and forms an aperture portion AP. That is, the black matrix BM is arranged so that line portions, such as the source line S, the gate line, the auxiliary capacitance line, and the switching element, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

A color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence of concave-convex of the surface of the color filter CF.

The common electrode CE is formed on the overcoat layer OC facing the array the substrate AR. The distance between the common electrode CE and the pixel electrode PE in a third direction Z is substantially the same. The third direction Z is a direction which intersects perpendicularly the first direction X and the second direction Y, i.e., a normal line direction of the liquid crystal display panel LPN.

The second alignment film AL2 is arranged on the counter substrate CT facing the array substrate AR, and extends to whole active area ACT. The second alignment film AL2 covers the common electrode CE, the overcoat layer OC, etc. The second alignment film AL2 is formed of materials which show horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 and a second alignment treatment direction PD2 in which the first alignment film AL1 and the second alignment film AL2 initially align the molecules are in parallel, and the same directions or opposite directions each other. For example, the first alignment treatment direction PD1 and the second alignment treatment direction PD2 are in parallel with the second direction Y and are the same directions each other as shown in FIG. 2A.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material SB arranged outside the active area ACT, while the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains liquid crystal molecules which are not illustrated. The liquid crystal layer LQ is constituted by positive type liquid crystal material.

A first optical element OD1 is attached on an external surface 10B of the array substrate AR, i.e., the external surface of the first insulating substrate 10 which constitutes the array substrate AR, by adhesives, etc. The first optical element OD1 is located in a side which counters with the backlight 4 of the liquid crystal display panel LPN, and controls the polarization state of the incident light which enters into the liquid crystal display panel LPN from the backlight 4. The first optical element OD1 includes a first polarizing plate PL1 having a first polarization axis (or first absorption axis) AX1.

A second optical element OD2 is attached on an external surface 20B of the counter substrate CT, i.e., the external surface of the second insulating substrate 20 which constitutes the counter substrate CT, by adhesives, etc. The second optical element OD2 is located on a display surface side of the liquid crystal display panel LPN, and controls the polarization state of emitted light from the liquid crystal display panel LPN. The second optical element OD2 includes a second polarizing plate PL2 having a second polarization axis (or second absorption axis) AX2.

Figure 2B:
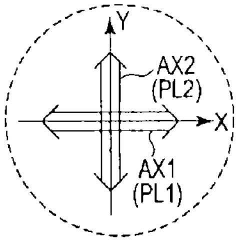
FIGS. 2B and 2C are views showing polarizing axis directions of polarization plates.
Figure 2C:
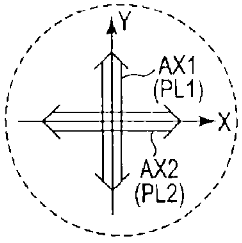

As shown in FIGS. 2B and 2C, the first polarization axis of the first polarizing plate PL1 and the second polarization axis of the second polarizing plate PL2 are arranged in the Cross Nicol state in which they substantially intersects perpendicularly. At this time, one polarizing plate is arranged, for example, so that the polarization axis is arranged in the initial alignment direction of the liquid crystal molecule, i.e., in orthogonal with or in parallel with the first alignment treatment direction PD1 or the second alignment treatment direction PD2. When the initial alignment direction is in parallel with the second direction Y, the polarization axis of one polarizing plate is in parallel with the second direction Y or the first direction X.

Next, the operation of the liquid crystal display panel LPN of the above-mentioned structure is explained referring to FIGS. 2A, 2B, 2C and 3.

At the time of non-electric field state (OFF), i.e., when potential difference (i.e., electric field) is not formed between the pixel electrode PE and the common electrode CE, the liquid crystal molecules LM of the liquid crystal layer LQ are aligned so that their long axes are aligned in a parallel direction with the first alignment treatment direction PD1 of the first alignment film AL1 and the second alignment treatment direction PD2 of the second alignment film AL2. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. Hereinafter, in order to explain simply, it is assumed that the liquid crystal molecule LM aligns in parallel with the X-Y plane, and rotates in parallel with the X-Y plane.

Here, both of the first alignment treatment direction PD1 of the first alignment film AL1 and the second alignment treatment direction PD2 of the second alignment film AL2 are directions in parallel to the second direction Y. At the time of OFF, the long axis of the liquid crystal molecule LM is initially aligned substantially in parallel to the second direction Y as shown by a dashed line in FIG. 2A. That is, the initial-alignment direction of the liquid crystal molecule LM is a direction in parallel with the second direction Y or a direction making 0° with respect to the second direction Y.

When the first alignment treatment direction PD1 and the second alignment treatment direction PD2 are in parallel and the same directions as shown in FIG. 2A, in the cross section of the liquid crystal layer LQ, the liquid crystal molecule LM aligns substantially in a horizontal direction near an intermediate portion of the liquid crystal layer LQ (pre-tilt angle is substantially zero). That is, the liquid crystal molecule LM aligns with the pre-tilt angle in symmetrical with respect to the intermediate portion in vicinities of the first alignment film AL1 and the second alignment film AL2 (splay alignment).

Here, since the alignment treatment for the first alignment film AL1 is performed in the first alignment treatment direction PD1, the liquid crystal molecule near the first alignment film AL1 is initially aligned in the first alignment treatment direction PD1. Similarly, since the alignment treatment for the second alignment film AL2 is performed in the second alignment treatment direction PD2, the liquid crystal molecule near the second alignment film AL2 is initially aligned in the second alignment treatment direction PD2. When the first alignment treatment direction PD1 and the second alignment treatment direction PD2 are in parallel and the same direction, in the cross section of the liquid crystal layer LQ, the liquid crystal molecules LM becomes the splay alignment state as described above. Accordingly, the alignment of the liquid crystal molecule LM near the first alignment film AL1 on the array substrate AR becomes symmetrical with the alignment of the liquid crystal molecule LM near the second alignment film AL2 on the counter substrate CT. In the splay alignment state of the liquid crystal molecule LM, the display is optically compensated even in an inclining direction from the normal direction of the substrate by the molecules near the first alignment film AL1 and the second alignment film AL2. Therefore, when the first alignment film AL1 and the second alignment film AL2 are in parallel and the same directions mutually, there are few optical leaks in a black display. Accordingly, high contrast ratio can be realized, and it becomes possible to improve display grace.

In addition, when the first alignment film AL1 and the second alignment film AL2 are in parallel and opposite directions each other in the cross section of the liquid crystal layer LQ, the liquid crystal molecule LM aligns with a uniform pre-tilt angle in the intermediate portion of the liquid crystal layer LQ, and near the first alignment film AL1 and second alignment film AL2 (homogeneous alignment).

A portion of the backlight from the backlight 4 penetrates the first polarizing plate PL1, and enters into the liquid crystal display panel LPN. The polarization state of the entered light changes with the alignment state of the liquid crystal molecule LM when the light passes the liquid crystal layer LQ. At the time OFF, the light which penetrates the liquid crystal display panel LPN is absorbed by the second polarizing plate PL2 (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In the example shown in FIG. 2A, in the regions between the main common electrode CAL and the left-hand main pixel electrode PA, and between the main common electrode CAC and the right-hand main pixel electrode PA, the liquid crystal molecule LM rotates clockwise to the second direction Y, and aligns so that it may turn to the lower left in the figure. On the other hand, in the regions between the right-hand main pixel electrode PA and the main common electrode CAR, and between the left-hand main pixel electrode PA and the main common electrode CAC, the liquid crystal molecule LM rotates counter-clockwise to the second direction Y, and aligns so that it may turn to the lower right in the figure.

Thus, in each pixel PX, in case electric field is formed between the pixel electrode PE and the common electrode CE, the alignment direction of the liquid crystal molecule LM is divided into a plurality of directions by the position which overlaps with the pixel electrode PE and the common electrode CE, and domains are formed in each alignment direction. That is, a plurality of domains is formed in one pixel PX.

At the time of ON, a portion of the backlight which entered into the liquid crystal display panel LPN from the backlight 4 penetrates the first polarizing plate PL1, and enters into the liquid crystal display panel LPN. When the back light passes the liquid crystal layer LQ, the polarization state of the backlight changes in accordance with the alignment state of the liquid crystal molecule LM. At the time of ON, at least a portion of the light which passes the liquid crystal layer LQ penetrates the second polarizing plate PL2 (white display).

In addition, in the liquid crystal display device according to this embodiment, the pixel electrode PE of each pixel PX is arranged on the array substrate AR surrounded with the common electrode CE formed in the counter substrate CT. Therefore, electric flux line has a starting point and a terminal point within one pixel, and the electric flux line in one pixel does not leak to adjacent pixels. For this reason, it can be controlled that the electric field impressed to the liquid crystal layer LQ is mutually affected between the adjacent pixels PX. Accordingly, the liquid crystal molecules of one pixel PX do not move under the influence of the electric field from adjacent pixels PX in the second direction Y, and degradation of display grace can be controlled.

Moreover, in this embodiment, the main common electrode CAC is not formed facing the sub-electrode PB when seeing from the counter substrate side. Similarly, the sub-common electrode CBC is not formed facing the pixel electrode PA. Therefore, the main common electrode CAC does not counter the sub-electrode PB, and also, the sub-common electrode CBC does not counter the main pixel electrode PA. Accordingly, electric field is not generated in the direction substantially orthogonally crossing the X-Y plane in the aperture AP of the pixel PX.

For example, when the pixel electrode and the common electrode counter in the aperture AP, an electric field is generated in a direction orthogonally crossing the X-Y plane. In this case, since backlight does not penetrate in the circumference of the electric field in the orthogonal direction crossing the X-Y plane, transmissivity fall is resulted. On the other hand, the electric field is not generated in the direction orthogonally crossing the X-Y plane in the pixel in this embodiment. Accordingly, it becomes possible to suppress the generation of the electric field in the direction orthogonally crossing the X-Y plane and the decrease in the transmissivity.

In addition, the ends of the main common electrode CAC and the sub-pixel electrode PB extending in the first direction X are arranged with a predetermined distance therebetween when seeing from the counter substrate side. Similarly, the ends of the sub-common electrode CBC and the main pixel electrodes PA extending in the second direction Y are arranged with a predetermined distance therebetween. Accordingly, even if an assembly shift is generated between the array substrate AR and the counter substrate CT, and the arranged locations of the pixel electrode PE and the common electrode CE are shifted from designed locations, it becomes possible to avoid the generation of the electric field in the orthogonal direction crossing the X-Y plane and to suppress the decrease in the transmissivity.

Furthermore, in this embodiment, the contact portion PC of the pixel electrode PE extends to the source line S1 and S2 sides beyond the ends of the main pixel electrodes PA in the first direction X. Regions between the main common electrode CAC and the main pixel electrode PA are surrounded with the contact portion PC, the main pixel electrode PA, the main common electrodes CAC and the sub-common electrode CBC. Similarly, regions between the main common electrodes CAL, CAR and the main pixel electrode PA are respectively surrounded with the contact portion PC, the main pixel electrode PA, the main common electrodes CAL, CAR and the sub-common electrode CBC by extending the contact portion PC to the source line S1 and S2 sides. Thereby, substantially the same electric field as that between the main common electrode CAC and the main pixel electrode PA is impressed to both regions between the main common electrode CAL and the main pixel electrode PA, and between the main common electrode CAR and the main pixel electrode PA. Therefore, in the liquid crystal display device according to this embodiment, it becomes possible to fully control the alignment state of the liquid crystal molecule LM along the ends of the pixel PX in the second direction Y, and to avoid the decrease in the transmissivity of the display panel. That is, it becomes possible to supply the liquid crystal display device which can control degradation of display grace.

In addition, in the case shown in FIG. 2A, though the ends of the contact portion PC facing the source lines S1 and S2 in the first direction X extend to the source line S1 and S2 sides beyond the end of the main pixel electrode PA, at least a portion of the contact portion PC may extend to the source line S1 and S2 sides. That is, the contact portion PC may have a convex portion projected in the first direction X beyond the end of the main pixel electrode PA. Also, in this case, the same effect as the above embodiment can be acquired.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CAL and CAR in order to make transmissivity of each pixel high enough. Moreover, in the product specifications in which the pixel pitch differs each other, the same effect as the embodiment mentioned above can be acquired by changing the inter-electrode distance and using a peak condition of a transmissivity distribution. That is, in the display mode according to this embodiment, it becomes possible to supply the display device having various pixel pitches by setting up inter-electrode distance corresponding to the product specification from low resolution with a comparatively large pixel pitch to high resolution with a comparatively small pixel pitch without necessarily using microscopic processing. Therefore, it becomes possible to realize the demand for high transmissivity and high resolution easily.

Moreover, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE of the both sides and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control generating of mixed colors, and also becomes possible to realize more genuine color reproducibility nature.

In this embodiment, the main common electrode CAR and the main common electrode CAL counter with the source lines S, respectively. In the case the main common electrode CAL and the main common electrode CAR are arranged above the source line S1 and the source line S2, respectively, the aperture portion AP which contributes to the display can be expanded as compared with the case where the main common electrode CAL and the main common electrode CAR are arranged on the main pixel electrode PA side rather than above the source line S1 and the source line S2, and it becomes possible to improve the transmissivity of the pixel PX.

Moreover, it becomes possible to expand the distances between the pixel electrode PE and the main common electrode CAL, and between the pixel electrode PE and the main common electrode CAR by arranging each of the main common electrodes CAL and the main common electrode CAR above the source line S1 and the source line S2, respectively, and also becomes possible to form more horizontal electric field closer to the horizontal direction. For this reason, it becomes possible also to maintain the wide viewing angle which is advantages of the general IPS mode.

Moreover, according to this embodiment, it becomes possible to form a plurality of domains in each pixel. For this reason, a viewing angle can be optically compensated in a plurality of directions, and wide viewing angle is attained.

In addition, in the above-mentioned example, since the liquid crystal layer LQ has positive dielectric constant anisotropy, the case where the alignment direction of the liquid crystal molecule LM is in parallel to the second direction Y is explained. However, the initial alignment direction of the liquid crystal molecule LM may be the oblique direction D which obliquely crosses the second direction Y as shown in FIG. 2A. Herein, the angle θ1 which the initial alignment direction D makes with the second direction Y is larger 0° and smaller than 45°. In addition, it is extremely effective to set the angle θ1 in the range of 5° to 30°, more preferably less than 20° in a viewpoint of the alignment control of the liquid crystal molecule LM. That is, it is preferable that the initial alignment direction of the liquid crystal molecule LM is set to a direction substantially in parallel with a direction in the range of 0° to 20° with respect to the second direction Y.

Moreover, although the above-mentioned example explains the case where the liquid crystal layer LQ has positive dielectric constant anisotropy, the liquid crystal layer LQ may have negative dielectric constant anisotropy. Although detailed explanation is omitted, when the negative type liquid crystal material is used, it is desirable that the above-mentioned angle θ1 is made in the range of 45° to 90°, and preferably not less than 70° because the dielectric constant anisotropy has a contrast relation between the positive type and the negative type.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, and also hardly contributes to the display at the time of ON. Therefore, the pixel electrode PE and the common electrode CE do not necessarily need to be formed of a transparent electric conductive material, and may be formed using non-transparent electric conductive materials, such as aluminum (Al), silver (Ag), and copper (Cu).

Furthermore, the common electrode CE may include a second main common electrode (shield electrode) formed on the array substrate AR facing the source line S in addition to the main common electrode CA formed on the counter substrate CT. The second main common electrode extends substantially in parallel with the main common electrode CA and is set to the same potential as the main common electrode CA. It becomes possible to shield undesirable electric field from the source line S by providing the main common electrode.

In addition, when the second main common electrode is provided on the array substrate AR, the end of the contact portion PC may extend to the source line S side in the first direction X beyond the end of the main pixel electrode PA not so as to be electrically connected with the second main electrode.

Moreover, the common electrode CE may include a second sub-common electrode (shield electrode) formed on the array substrate AR facing the gate line G or the auxiliary capacitance line C in addition to the main common electrode CA formed on the counter substrate CT. The second sub-common electrode extends in a direction crossing the main common electrode CA and is set to the same potential as the main common electrode CA. It becomes possible to shield undesirable electric field from the gate line G or the auxiliary capacitance line C by providing the second sub-common electrode. It becomes possible further to control the decrease in the display quality according to the structure in which the first main common electrode and the second sub-common electrode are provided on the array substrate AR.

As explained above, according to this embodiment, it becomes possible to supply the liquid crystal display device which can control degradation of display grace.

Figure 4:
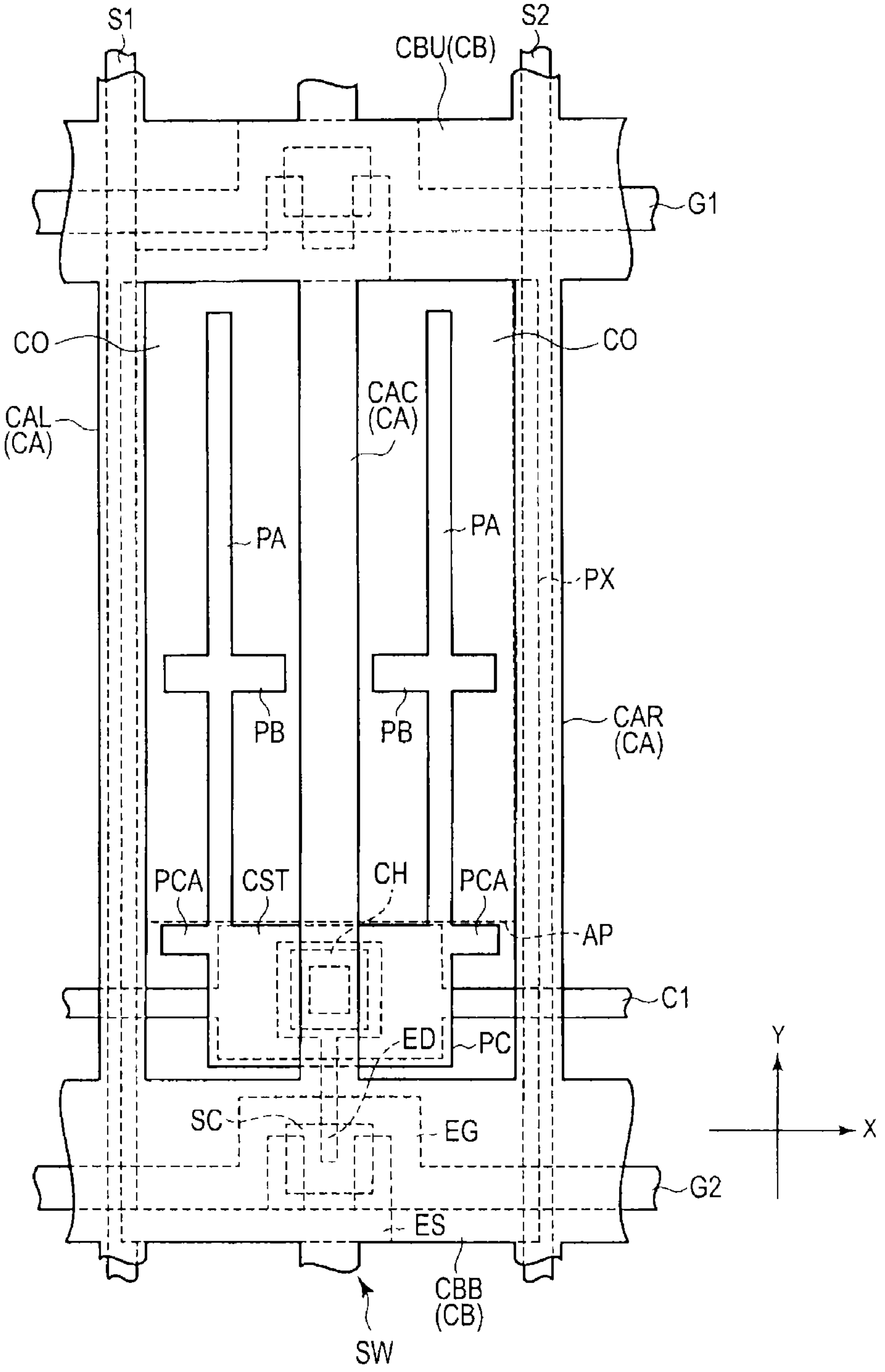
FIG. 4 is a plan view schematically showing a structure of a pixel when the display panel shown in FIG. 1 is seen from the counter substrate side according to a second embodiment.

Next, the liquid crystal display device according to a second embodiment is explained with reference to drawings. FIG. 4 is a plan view schematically showing a structure of a pixel when the display panel shown in FIG. 1 is seen from a counter substrate side.

In this embodiment, the main common electrode CA and the sub-pixel electrode PB do not counter each other like the above-mentioned first embodiment. The sub-pixel electrode PB extends in the first direction between the main common electrodes CA.

That is, the pixel electrodes PE include the main pixel electrode PA, the sub-pixel electrode PB, and the contact portion PC.

It has.

The sub-pixel electrode PB is formed between the contact portion PC and one end of the main pixel electrode PA near the gate line G1, and between the pair of main common electrodes CA. The sub-pixel electrode PB is not formed facing the main common electrodes CA when seeing from the counter substrate side. An end of the sub-pixel electrode PB extending in the second direction Y is arranged with a predetermined gap between the sub-pixel electrode PB and the main common electrodes CA extending in the second direction Y. That is, the sub-pixel electrode PB includes a cutout portion in which the main pixel electrode PA crosses the sub-pixel electrode PB. The sub-pixel electrode PB is electrically connected with the main pixel electrode PA in a cross shape between the main common electrodes.

In addition, at least a portion of the respective ends of the contact portion PC facing the source lines S1 and S2 may extend on the source line S1 and S2 sides. That is, the contact portion PC may be equipped with a convex portion PCA formed in the ends facing the source lines S1 and S2 projecting in the first direction X beyond the ends of the main pixel electrodes PA.

In each pixel PX, apertures CO surrounded with the common electrode CE extending in the first direction X and the second direction Y are formed. In this embodiment shown in FIG. 4, two apertures CO surrounded with the main common electrodes CAL, CAC, and CAR, and the sub-common electrodes CBU and CBB are arranged. In each aperture CO, the main pixel electrode PA and the sub-pixel electrode PB are arranged in a cross shape.

The structure of the liquid crystal display device according to this embodiment is the same as that of the first embodiment other than the above. The same effect as the first embodiment can be acquired.

In addition, the ends of the sub-pixel electrode PB and the main common electrode CAC extending in the second direction Y is arranged apart from each with a predetermined distance therebetween. Accordingly, even if the locations of the pixel electrode PE and the common electrode CE are shifted from the designed ones due to the assembling shift of the array substrate AR and the counter substrate CT, it becomes possible to avoid the generation of the electric field in the direction orthogonally crossing the X-Y plane and to suppress the decrease in the transmissivity.

According to this embodiment, it becomes possible to supply the liquid crystal display device which can control the decrease in the display quality like the first embodiment.

Figure 5:
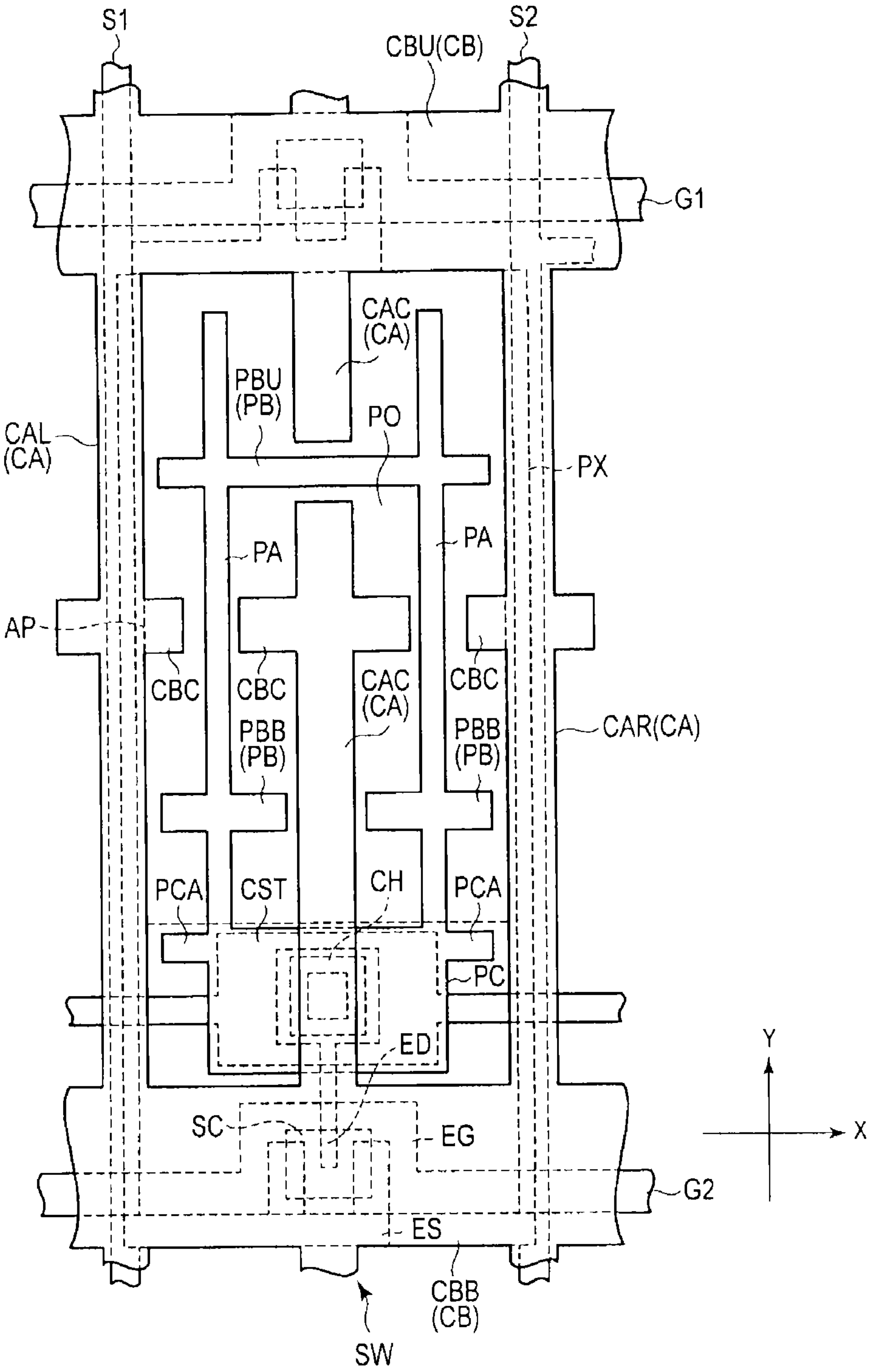
FIG. 5 is a plan view schematically showing a structure of a pixel when the display panel is seen from the counter substrate side according to a third embodiment.

Next, the liquid crystal display device according to a third embodiment is explained with reference to drawings. FIG. 5 is a plan view schematically showing the structure of a pixel when the display panel is seen from the counter substrate side. In the pixel PX, the width in the first direction X is about 50 μm, and the width in the second direction Y is about 150 μm.

In this embodiment, the structure of the pixel electrode PE differs from the above-mentioned first embodiment. The pixel electrode PE is equipped with a plurality of sub-pixel electrodes PB between the contact portion PC and the end of the main pixel electrode PA extending in the second direction Y. In this embodiment shown in FIG. 5, the pixel electrode PE includes two sub-pixel electrodes PB. Hereafter, the sub-pixel electrode arranged on the sub-common electrode CBU side in the figure is called PBU, and the sub-pixel electrode arranged on the contact portion PC side is called PBB.

The sub-pixel electrode PBU electrically connects the main pixel electrodes PA extending in the first direction X. The ends of the sub-pixel electrode PBU extending in the first direction X extend to the source line S1 and S2 sides beyond the ends of the main pixel electrodes PA and protrude from the ends of the main pixel electrodes PA, respectively.

The pair of sub-pixel electrodes PBB extending in the first direction X are arranged between the main common electrodes CA not so as to face the main common electrode CAC in the aperture AP when seeing from the counter substrate side. The sub-pixel electrode PBB is connected with the main pixel electrodes PA extending in the second direction Y and includes a cutout portion facing the main common electrode CAC. That is, ends of the cutout portion of the sub-pixel electrode PBB are arranged apart from the main common electrodes CA with a predetermined distance therebetween. The sub-pixel electrodes PBB are arranged between the main common electrode CAL and the main common electrodes CAC, and between the main common electrode CAR and the main common electrodes CAC forming an approximately cross form with the main pixel electrode PA, respectively.

The main common electrode CAC crosses the sub-pixel electrode at the cutout portion.

In addition, the sub-pixel electrodes PBU and PBB may extend to the source line S1 and S2 sides not so as to be electrically connected with the pixel electrodes arranged in the adjoining pixels PX and may extend on the source lines S1 and S2. When second main common electrodes (shield electrodes) are formed on the array substrate AR facing the source lines S, the contact portion PC and the sub-pixel electrode PB may extend to the source line S1 and S2 sides not so as to be electrically connected with the main common electrodes beyond the main pixel electrodes PA in the first direction X.

At least a portion of the respective ends of the contact portion PC facing the source lines S1 and S2 may extend on the source line S1 and S2 sides. That is, the contact portion PC may be equipped with a convex portion PCA formed in the ends facing the source lines S1 and S2 projecting in the first direction X beyond the ends of the main pixel electrodes PA.

The structure of the common electrode CE is the same as that of the first embodiment. Namely, the common electrode CE is equipped with the main common electrode CA and the sub-common electrode CB. The main common electrode CA includes the main common electrodes CAL and CAR arranged sandwiching the pixel electrode PE, and the main common electrode CAC facing the contact portion PC.

The main common electrode CAC is arranged between the sub-pixel electrodes PBU in the adjoining pixels in the second direction Y not so as to face the sub-pixel electrodes PBU. The main common electrode CAC includes a cutout portion facing the sub-pixel electrode PBU. That is, the ends of the sub-pixel electrodes PBU and the main common electrode CAC extending in the first direction X are arranged with a predetermined distance therebetween.

The sub-common electrode CBC is arranged between the sub-pixel electrodes PBU and PBB extending in the first direction X. The sub-common electrode CBC is arranged between the main pixel electrodes PA so that the sub-common electrode CBC does not face the main pixel electrodes PA. That is, the sub-common electrode CBC includes cutout portions facing the main pixel electrodes PA. The cutout ends of the sub-pixel electrodes CBC in the first direction X are arranged with a predetermined distance between the main pixel electrodes PA and the cutout ends of the sub-common electrode CBC.

The structure of the liquid crystal display device according to this embodiment is the same as that of the first embodiment other than the above. The same effect as the first embodiment can be acquired.

Moreover, in this embodiment, the sub-pixel electrode PBU electrically connects the main pixel electrodes PA, and the sub-pixel electrodes PBB are arranged between the main common electrodes CA not so as to face the main common electrode CA. However, the sub-pixel electrode PBU may be arranged between the main common electrodes CA so that the sub-pixel electrode PBU may not face the main common electrodes CA, and the sub-pixel electrode PBB may electrically connect the main pixel electrodes PA.

Even in the above modification, since the electric field in the direction orthogonally crossing with the X-Y plane is not generated in the aperture AP of the pixel PX, it becomes possible to suppress the decrease in the transmissivity.

In addition, in this embodiment, the ends of the sub-pixel electrode PBB extending in the first direction X are arranged apart from the main common electrode CAC extending in the second direction Y with a predetermined distance therebetween. The end of the main common electrode CAC and the sub-pixel electrode PBU are arranged apart from each other with a predetermined distance therebetween, and the ends of the sub-common electrode CBC extending in the first direction X are arranged apart from the main pixel electrodes PA with a predetermined distance therebetween. Accordingly, even if the locations of the pixel electrode PE and the common electrode CE shift from the designed positions due to the assembling shift between the array substrate AR and the counter substrate CT, it becomes possible to avoid the generation of the electric field in the direction orthogonally crossing with the X-Y plane, and to suppress the decrease in the transmissivity.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:

a first substrate provided with a pixel electrode including a contact portion, a pair of main pixel electrodes extending in a first direction from the contact portion, and a sub-pixel electrode arranged between the contact portion and an end of the extending main pixel electrode in the first direction, the sub-pixel electrode extending in a second direction orthogonally crossing the first direction so as to connect the pair of main pixel electrodes;

a second substrate provided with a common electrode including first and second main common electrodes sandwiching the pair of main pixel electrodes, a third main common electrode arranged substantially in the center between the pair of main pixel electrodes and extending in parallel with the first and second main common electrodes, and a first sub-common electrode arranged between the contact portion and the sub-pixel electrode in the first direction, the first sub-common electrode connected with the first, second and third main common electrodes and extending in the second direction; and a liquid crystal layer held between the first substrate and the second substrate and having liquid crystal molecules; wherein the third main common electrode includes a cutout portion, the sub-pixel electrode crosses the third main common electrode at the cutout portion, and the first sub-common electrode includes cutout portions, and the pair of main pixel electrodes cross the first sub-common electrode at the cutout portions, respectively, the first substrate includes a pair of source lines extending in the first direction, and the first and the second main common electrodes are arranged facing the source lines, respectively, the first substrate includes a pair of gate lines extending in the second direction, and a second sub-common electrode and a third sub-common electrode formed on the second substrate are arranged facing the gate lines, respectively, the second sub-common electrode and the third sub-common electrode sandwich the pair of main pixel electrodes and the contact portion, and the pixel electrode includes an aperture substantially in a shape of a rectangle surrounded with the pair of main pixel electrodes, the sub-pixel electrode, and the contact portion.

2. The liquid crystal display device according to claim 1, wherein ends of the cutout portions of the first sub-common electrode are arranged apart from the main pixel electrodes with a predetermined distance therebetween when seeing from the counter substrate side.

3. The liquid crystal display device according to claim 1, wherein ends of the cutout portion of the third main common electrode are arranged apart from the sub-pixel electrode with a predetermined distance therebetween when seeing from the counter substrate side.

4. The liquid crystal display device according to claim 1, wherein the contact portion, the first sub-common electrode and the sub-pixel electrode are arranged in turns in the second direction, and the distance between the contact portion and the first sub-common electrode is substantially equal to the distance between the first sub-common electrode and the sub-pixel electrode.

5. The liquid crystal display device according to claim 1, wherein at least a portion of respective ends of the contact portion PC facing the source lines projects in the second direction beyond the ends of the pair of main pixel electrodes.

6. The liquid crystal display device according to claim 1, wherein the contact portion is arranged close to one of the gate lines.

7. A liquid crystal display device, comprising:

a first substrate provided with a pixel electrode including a contact portion, first and second main pixel electrodes extending in a first direction from the contact portion, and a first sub-pixel electrode and a second sub-pixel electrode arranged between the contact portion and an end of the extending main pixel electrode in the first direction;

a second substrate provided with a common electrode including first and second main common electrodes sandwiching the first and second main pixel electrodes, a third main common electrode arranged substantially in the center between the first and second main pixel electrodes and extending in parallel with the first and second main common electrodes, and a first sub-common electrode arranged between the first sub-pixel electrode and the second sub-pixel electrode in the first direction, the first sub-common electrode connected with the first, second and third main common electrodes and extending in the second direction; and a liquid crystal layer held between the first substrate and the second substrate and having liquid crystal molecules; wherein the third main common electrode includes a cutout portion, and the first sub-pixel electrode crosses the third main common electrode at the cutout portion, the first sub-common electrode includes cutout portions facing the first and second main pixel electrodes, and the first and second main pixel electrodes cross the first sub-common electrode at the cutout portions, respectively, the second sub-pixel electrode is connected with the main pixel electrodes extending in the second direction and includes a cutout portion facing the third main common electrode, the third main common electrode crosses the second sub-pixel electrode at the cutout portion, the first substrate includes a pair of source lines extending in the first direction, and the first and the second main common electrodes are arranged facing the source lines, respectively, the first substrate includes a pair of gate lines extending in the second direction, and a second sub-common electrode and a third sub-common electrode formed on the second substrate are arranged facing the gate lines, respectively, the second sub-common electrode and the third sub-common electrode sandwich the first and second main pixel electrode and the contact portion, and the pixel electrode includes an aperture substantially in a shape of a rectangle surrounded with the first and second main pixel electrodes, the first sub-pixel electrode and the contact portion.

8. The liquid crystal display device according to claim 7, wherein ends of the cutout portions of the first sub-common electrode are arranged apart from the main pixel electrodes with a predetermined distance therebetween when seeing from the counter substrate side.

9. The liquid crystal display device according to claim 7, wherein ends of the cutout portion of the third main common electrode are arranged apart from the first sub-pixel electrode with a predetermined distance therebetween when seeing from the counter substrate side.

10. The liquid crystal display device according to claim 7, wherein ends of the cutout portion of the second sub-pixel electrode are arranged apart from the third main common electrode with a predetermined distance therebetween when seeing from the counter substrate side.

11. The liquid crystal display device according to claim 7, wherein the contact portion, the second sub-pixel electrode, the first sub-common electrode, and the first sub-pixel electrode are arranged in turns in the first direction.

12. The liquid crystal display device according to claim 7, wherein at least a portion of respective ends of the contact portion PC facing the source lines projects in the second direction beyond the ends of the first and second main pixel electrodes.

13. The liquid crystal display device according to claim 7, wherein the contact portion is arranged close to one of the gate lines.

14. A liquid crystal display device, comprising:

a first substrate provided with a pixel electrode including a contact portion, a first main pixel electrode and a second main pixel electrode extending in a first direction from the contact portion, a second substrate provided with a common electrode including first, second, and third main common electrodes extending in parallel with the first and second main pixel electrodes, a liquid crystal layer held between the first substrate and the second substrate and having liquid crystal molecules; wherein the first main pixel electrode is arranged between the first main common electrode and the second main pixel electrode, and the second main pixel electrode is arranged between the second main common electrode and the third main common electrode, and the pixel electrode further includes a first sub-pixel electrode extending from the first main pixel electrode toward the first and second main common electrodes in the second direction not so as to overlap with the first and second main common electrodes, and a second sub-pixel electrode extending from the second main pixel electrode toward the second and third main common electrodes in the second direction not so as to overlap with the second and third main common electrodes, wherein the second substrate includes a first sub-common electrode and a second sub-common electrode extending in the second direction, so as to sandwich the first and second main pixel electrodes and the contact portion, the first substrate includes an auxiliary capacitance line extending in the second direction including a capacitance portion in which the width in the second direction is broadened in a substantially central portion in the first direction of one pixel, and the contact portion is formed more widely than the main pixel electrode in the second direction and arranged facing the capacitance portion.

15. The liquid crystal display device according to claim 14, wherein the first substrate further includes a pair of source lines extending in the first direction, and the first and third main common electrodes are arranged facing the source lines, respectively.

16. The liquid crystal display device according to claim 14, wherein the first substrate further includes a pair of gate lines extending in the second direction, and a first sub-common electrode and the second sub-common electrode are arranged facing the gate lines, respectively.

17. The liquid crystal display device according to claim 1, wherein ends of the sub-pixel electrodes extend to the source line sides and protrude beyond ends of the first and second main pixel electrodes.

18. The liquid crystal display device according to claim 1, wherein the first substrate includes an auxiliary capacitance line extending in the second direction, the auxiliary capacitance line includes a capacitance portion in which the width in the second direction is broadened in a substantially central portion in the first direction of one pixel, and the contact portion is formed more widely than the main pixel electrode and arranged facing the capacitance portion.

19. The liquid crystal display device according to claim 7, wherein ends of the sub-pixel electrodes extend to the source line sides and protrude beyond ends of the first and second main pixel electrodes.

20. The liquid crystal display device according to claim 7, wherein the first substrate includes an auxiliary capacitance line expending in the second direction, the auxiliary capacitance line includes a capacitance portion in which the width in the second direction is broadened in a substantially central portion in the first direction of one pixel, and the contact portion is formed more widely than the main pixel electrode and arranged facing the capacitance portion.

* * * * *